United States Patent
Baettig

(10) Patent No.: US 6,709,502 B2
(45) Date of Patent: Mar. 23, 2004

(54) MONOAZO DYES AND THEIR PREPARATION AND USE

(75) Inventor: Kurt Baettig, Praroman (CH)

(73) Assignee: Ilford Imaging Switzerland GmbH (CH)

(*) Notice: Subject to any disclaimer, the term of this patent is extended or adjusted under 35 U.S.C. 154(b) by 12 days.

(21) Appl. No.: 10/023,004

(22) Filed: Dec. 17, 2001

(65) Prior Publication Data

US 2002/0121221 A1 Sep. 5, 2002

(30) Foreign Application Priority Data

Dec. 21, 2000  (EP) .............................. 00811216

(51) Int. Cl.⁷ ................. C09D 11/02; C07C 245/10; C09B 29/30
(52) U.S. Cl. ................. 106/31.51; 534/842; 534/861; 8/639; 8/682
(58) Field of Search .............. 106/31.51; 534/842, 534/861, 846; 8/639, 682

(56) References Cited

U.S. PATENT DOCUMENTS 3,558,592 A * 1/1971 de Montmollin ........... 534/873
4,626,284 A   12/1986 Ohta et al.

(List continued on next page.)

FOREIGN PATENT DOCUMENTS

CH          343231        12/1959

(List continued on next page.)

Primary Examiner—Helene Klemanski
(74) Attorney, Agent, or Firm—Dara L. Onofrio, Esq.; Onofrio Law

(57) ABSTRACT

Monoazo dyes of formulas (IV)

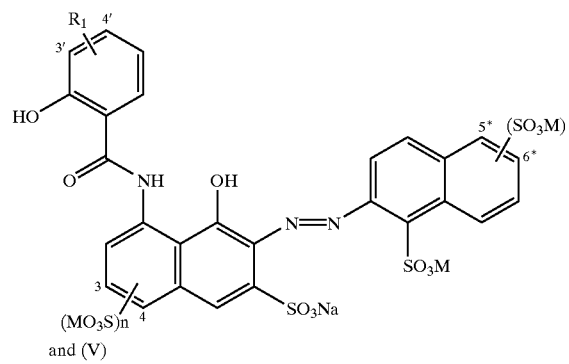

and (V)

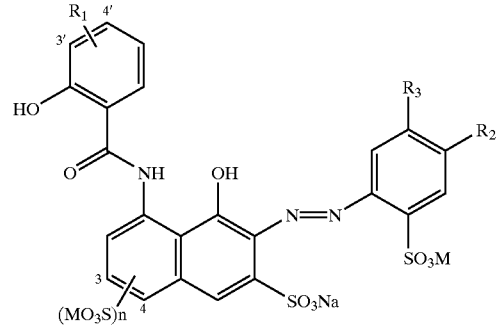

wherein $R_1$, $R_2$, $R_3$, m, n and M are as described in the specification, are excellent dyes for dyeing and printing of cellulose containing materials and especially for the preparation of inks for ink jet printing.

8 Claims, 1 Drawing Sheet

U.S. PATENT DOCUMENTS

| | | | |
|---|---|---|---|
| 4,703,113 A | | 10/1987 | Baxter et al. |
| 4,963,189 A | | 10/1990 | Hindagolla |
| 5,074,914 A | | 12/1991 | Shirota et al. |
| 5,135,571 A | * | 8/1992 | Shirota et al. ........... 106/31.51 |
| 5,254,160 A | | 10/1993 | Beach et al. |
| 5,399,182 A | * | 3/1995 | Schwarz et al. ................ 8/639 |
| 5,494,507 A | * | 2/1996 | Beach et al. ............. 106/31.49 |
| 5,542,970 A | | 8/1996 | Miura et al. |
| 5,607,502 A | * | 3/1997 | Hassenruck et al. ..... 106/31.51 |
| 5,700,314 A | * | 12/1997 | Kurbayashi et al. ..... 106/31.27 |
| 6,068,687 A | | 5/2000 | Baettig et al. |
| 6,183,549 B1 | * | 2/2001 | Wight .................... 106/31.51 |
| 6,395,885 B1 | * | 5/2002 | Lavery et al. ............... 534/634 |
| 2002/0050225 A1 | * | 5/2002 | Mafune et al. ........... 106/31.27 |

FOREIGN PATENT DOCUMENTS

| | | |
|---|---|---|
| EP | 0345763 A2 | 12/1989 |
| EP | 0366121 A2 | 5/1990 |
| EP | 0425150 A2 | 10/1990 |
| EP | 0507239 A1 | 10/1992 |
| EP | 0597672 A2 | 5/1994 |
| EP | 0602816 A1 | 6/1994 |
| EP | 0918074 A1 | 5/1999 |
| EP | 1006157 A1 | 6/2000 |
| GB | 779615 | 7/1957 |
| GB | 2131825 A | 6/1984 |
| GB | 2289473 | 11/1995 |
| JP | 3-203970 | 9/1991 |
| WO | WO 96/24636 | 8/1996 |

* cited by examiner

MONOAZO DYES AND THEIR PREPARATION AND USE

FIELD OF THE INVENTION

The invention relates to novel monoazo dyes and their salts, a method of their preparation and their use in dying and printing operations. It relates also to liquid dye preparations containing these dyes, particularly to aqueous inks for ink jet printing.

BACKGROUND OF THE INVENTION

Ink jet printing processes are essentially of two types:

In continuous stream ink jet printing systems, ink is emitted in a continuous stream under pressure through a nozzle. The stream breaks up into droplets at a certain distance from the nozzle. If a specific location on the recording sheet has to be printed the individual droplets are directed to the recording sheet, otherwise they are directed to a gutter. This is done for example by charging unnecessary droplets in accordance with digital data signals and passing them through an electrostatic field which adjusts the trajectory of these droplets in order to direct them to the gutter. The inverse procedure may also be used wherein uncharged droplets are directed to the gutter.

In the non-continuous process, or the so-called "drop-on-demand" systems, droplets are generated in accordance with digital data signals only if a specific location on the recording sheet has to be printed.

The speed of ink jet printers of the newest generation is, for economic reasons, ever increasing. Digital images, captured with digital cameras or generated by scanning of silver halide camera films, may be printed with these modern printers with a quality level that make them nearly indistinguishable from classical copies on silver halide materials. Images produced in this way need to have an excellent storage stability even under adverse conditions. This can only be achieved by using a finely tuned system of inks (respectively the dyes contained therein) together with a suitable recording sheet.

Recording sheets particularly suitable for these printers and photo realistic recordings need to absorb the inks very rapidly. The recording sheets comprise organic polymers and/or microporous inorganic oxides. Up to now the produced images do not have all the properties required. Particularly the diffusion fastness of images printed onto such recording sheets under conditions of high temperature and humidity is unsatisfactory. Images printed onto such recording sheets, using inks containing dyes that are state of the art, lose their sharpness under the influence of heat and humidity or show uncontrollable density changes or color shifts. Therefore, there is a need for dyes with excellent diffusion fastness in order to increase the diffusion fastness of images printed onto these recording sheets under conditions of high humidity and heat.

Although quite a number of different dyes have already been proposed as dyes for ink jet printing, none meets all the necessary requirements.

The magenta dye of formula (I) (Example No. 2) is described in U.S. Pat. No. 5,542,970.

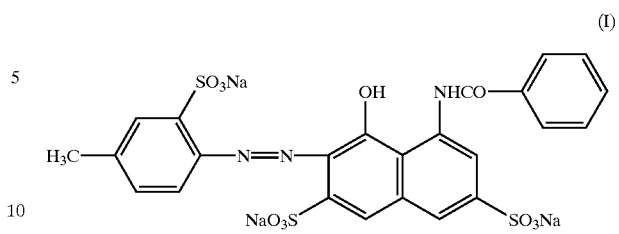

The magenta dye of formula (II) (Example No. 1) is described in U.S. Pat. No. 5,254,160.

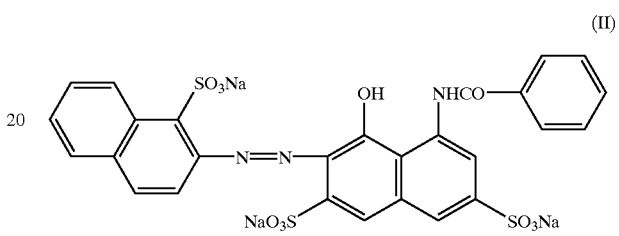

The magenta dye of formula (III) (Example No. 1) is described in patent application JP 03-203,970.

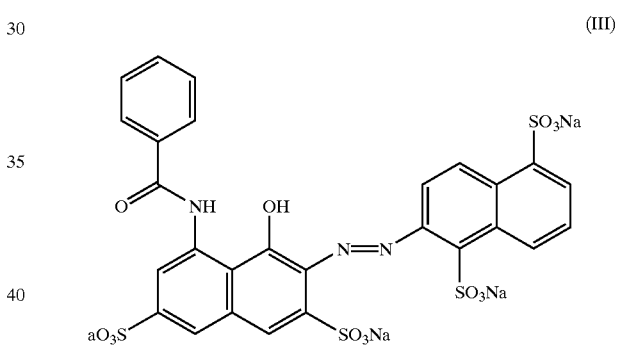

All these dyes, representing the state of the art, do not satisfy all the required demands if they are used in the formulation of inks for ink jet printing that should provide brilliant images or colorings with excellent color rendition (extended gamut) on any type of recording sheet as plain or coated paper, coated or uncoated, opaque or transparent synthetic materials, because these dyes diffuse under conditions of high temperature and humidity and the sharpness of the images is deteriorated.

Dyes used for such recording liquids need to have a good solubility in the essentially aqueous ink liquid, they have to penetrate into the recording sheet and should not show dye aggregation on the surface of the recording sheet ("bronzing"). They need to provide printed images having high optical density, good water fastness, good light stability and good storage stability even under adverse conditions. They need to be stable in the ink even when the recording liquid is stored for a long time under adverse conditions.

Various types of compositions have been proposed as inks for ink jet printing. Typical inks comprise one or more dyes or pigments, water, organic cosolvents and other additives.

The inks have to meet the following criteria:

(1) The ink gives images of excellent quality on any type of recording sheet.
(2) The ink gives printed images exhibiting good water fastness.
(3) The ink gives printed images exhibiting good light stability.
(4) The ink gives printed images exhibiting excellent smudge behavior.
(5) The ink gives printed images exhibiting excellent storage stability under conditions of high temperature and humidity.
(6) The ink does not clog jetting nozzles of the ink jet printers even when these are kept uncapped while recording is suspended for long periods.
(7) The ink may be stored for long periods of time without deterioration of its quality.
(8) The values of the physical properties of the inks, such as viscosity, conductivity and surface tension are all within defined ranges well suited for the intended use.
(9) The ink has to be non-toxic, not flammable and safe.

SUMMARY OF THE INVENTION

Accordingly, an object of the invention is to provide novel monoazo dyes with a red or magenta hue and showing, at the same time, excellent light stability, water fastness, diffusion fastness and high solubility. They provide images or colorings showing good overall properties, in particular in the ink jet printing process, where they provide images with maximum color rendition, and where the sharpness of the images does not or only slightly deteriorate during long periods of storage under conditions of high temperature and humidity.

Another object of the invention is the provision of liquid dye preparations, especially of recording liquids for ink jet printing, showing a spectrally unchanged hue on any type of recording sheet as plain or coated paper, coated or uncoated, opaque or transparent synthetic materials.

A further object of the present invention is the provision of inks satisfying all the requirements mentioned above.

In the present invention, these purposes, as well as others which will be apparent, are achieved generally by providing novel monoazo dyes of general formulas (IV) and (V) detailed below.

Other objects, features, and advantages of the present invention will become apparent from the following detailed description of the invention when considered with reference to the drawings, as follows:

DETAILED DESCRIPTION OF THE INVENTION

Figure 1:
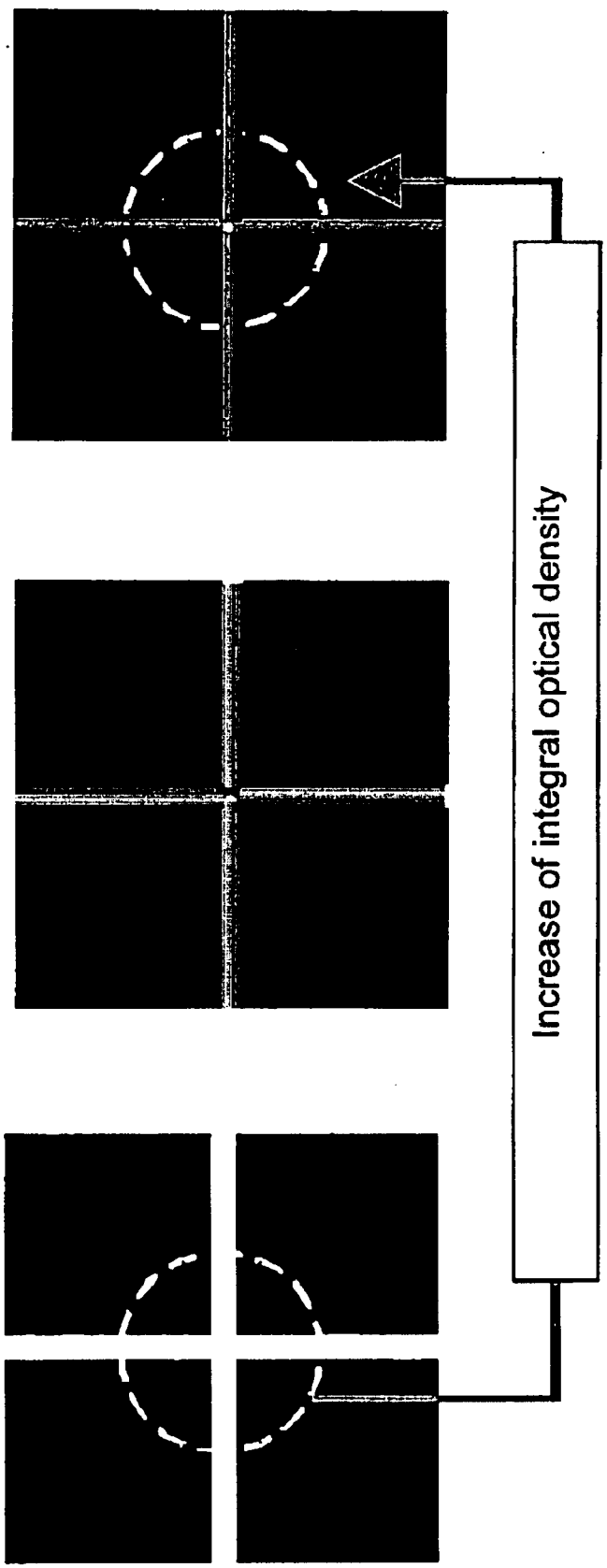
FIG. 1 illustrates an example of increasing dye diffusion in accordance with the invention.

The present invention relates to novel monoazo dyes of general formulas (IV)

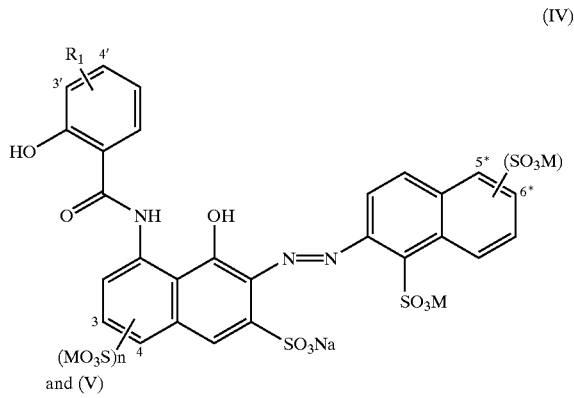

(IV)

and (V)

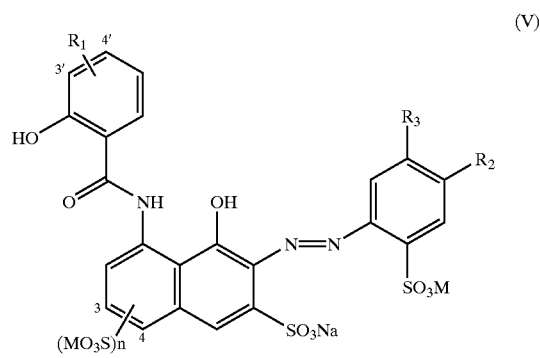

(V)

wherein $R_1$ represents hydrogen, alkyl having from 1 to 6 C atoms, nitro, fluoro, chloro or bromo;

$R_2$, $R_3$ independently represent hydrogen, alkyl or alkoxy each having from 1 to 6 C atoms, substituted amide having up to 6 C atoms, where the substituents are selected from the group consisting of carboxy, hydroxy, carboxymethyl and carboxyethyl; fluoro, chloro or bromo;

m is 0, 1 or 2;

n is 0 or 1 and

M represents hydrogen, a metal cation or an ammonium cation, which may be substituted by one or more alkyl or substituted alkyl groups each having from 1 to 18 C atoms.

Especially preferred are monoazo dyes, wherein M and n are as described above;

$R_1$ represents hydrogen, alkyl having 1 or 2 C atoms, chloro or bromo;

$R_2$, $R_3$ independently represent hydrogen, alkyl or alkoxy each having 1 or 2 C atoms, substituted amide having up to 6 C atoms, where the substituents are selected from the group consisting of carboxy, carboxymethyl and carboxyethyl; chloro or bromo; and m is 0 or 1.

As metal cations the cations of the alkali metals (Li, Na, K, Rb, Cs) and of the alkaline earth metals (Mg, Ca, Sr, Ba) are preferred.

The prepared dyes of general formula (IV) are listed in Table 1 together with the position of their absorption maximum in aqueous solution:

TABLE 1

| Compound No. | n | Position | m | Position | $R_1$ | Position | M | $\lambda_{max}$ in $H_2O$ (nm) |
|---|---|---|---|---|---|---|---|---|
| 10 | 1 | 3 | 1 | 5* | H | | Na | 540 |
| 11 | 1 | 3 | 1 | 5* | $CH_3$ | 3' | Na | 542 |
| 12 | 1 | 3 | 0 | | $CH_3$ | 3' | Li | 547 |
| 13 | 1 | 3 | 0 | | H | | Li | 545 |
| 14 | 1 | 4 | 0 | | H | | K | 515 |
| 15 | 1 | 4 | 1 | 5* | H | | Na | 510 |
| 16 | 1 | 4 | 1 | 5* | $NO_2$ | 4' | Na | 525 |
| 17 | 1 | 3 | 2 | 5*, 7* | H | | Na | 538 |

The prepared dyes of general formula (V) are listed in Table 2 together with the position of their absorption maximum in aqueous solution:

TABLE 2

| Compound No. | n | Position | $R_1$ | Position | $R_2$ | $R_3$ | M | $\lambda_{max}$ in $H_2O$ (nm) |
|---|---|---|---|---|---|---|---|---|
| 18 | 1 | 3 | H | | $CH_3$ | H | Na | 542 |
| 19 | 1 | 3 | H | | H | H | K | 513 |
| 20 | 1 | 3 | $CH_3$ | 3' | $CH_3$ | H | Na | 543 |
| 21 | 1 | 3 | H | | $OCH_3$ | H | Na | 553 |
| 22 | 1 | 3 | H | | H | $NHCOCH_3$ | Li | 512 |
| 23 | 1 | 3 | H | | H | $NHCO(CH_2)_2COOM$ | Na | 514 |

The compounds of general formulas (IV) and (V) may be in the free acid form or in the form of inorganic or organic salts thereof. Preferably, they are in the form of their alkali or ammonium salts, wherein the ammonium cation may be substituted. Examples of such substituted ammonium cations are 2hydroxyethylammonium, bis-(2-hydroxyethyl)-ammonium, tris-(2-hydroxyethyl)-ammonium, bis-(2-hydroxyethyl)-methylammonium, tris-[2-(2-methoxyethoxy)-ethyl]-ammonium, 8-hydroxy-3,6-dioxaoctylammonium and tetraalkylammonium such as tetramethylammonium or tetrabutylammonium.

The invention not only relates to pure dyes of general formulas (IV) and (V), but also to mixtures of these compounds.

The invention further claims a process for the preparation of the monoazo dyes of formulas (IV) and (V) according to the invention, characterized in that an amine of general formula (VI)

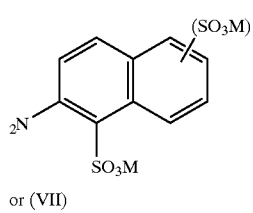

or (VII)

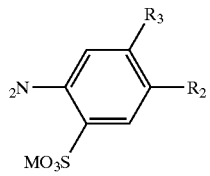

wherein $R_2$, $R_3$, m and M are as defined above, is diazotized and subsequently coupled with a compound of formula (VII),

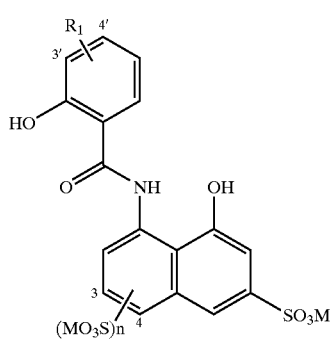

wherein M, $R_1$ and n are as defined above, under conditions that the dyes of general formulas (IV) and (V) according to the invention are formed.

The dyes of formulas (IV) and (V) according to the invention are used to dye cellulose containing materials, paper, cotton and viscose as well as leather and wool to provide dyed material with good water fastness and light stability. All methods well known in the textile and paper industries for dyeing with substantive dyes may be used with the dyes, preferably for the bulk or surface treatment of sized or unsized paper. The dyes may also be used in the dyeing of yarns and piece goods of cotton, viscose and linen by the exhaustion process from a long liquor or in a continuous process.

The invention furthermore relates to liquid dye preparations comprising at least one dye of general formulas (IV) or (V). The use of such liquid dye preparations is preferred for paper dyeing. Such stable, liquid, preferably aqueous, concentrated dye preparations may be obtained by using methods well known in the art, preferably by dissolving in suitable solvents. The possibility of preparation of such stable aqueous concentrated preparations in the course of dye synthesis itself, without intermediate isolation of the dye, for example after a desalting step by diafiltration of the reaction solution, is of particular advantage.

Dyes or mixtures of dyes of general formulas (IV) and (V) are excellent dyes for the preparation of inks for ink jet printing.

The dyes of general formulas (IV) or (V) may well be combined with other magenta dyes, in particular those described in patent applications WO 96124,636, EP 0,918,074 and EP 1,006,157 and in U.S. Pat. No. 5,074,914.

A suitable ink comprises one or more of the compounds according to the invention in a liquid aqueous medium. The ink contains from 0.5 to 20% by weight, preferably from 0.5 to 8% by weight, of these compounds, based on the total weight of the ink. The liquid medium is preferably water or a mixture of water and water miscible organic solvents. Suitable solvents are given for example in U.S. Pat. No. 4,626,284, U.S. Pat. No. 4,703,113 and U.S. Pat. No. 4,963,189 and in patent applications GB 2,289,473, EP 0,425,150 and EP 0,597,672.

The present invention will be illustrated in more detail by the following examples without limiting the scope of the claimed compounds in any way.

EXAMPLES

Example 1

Compound No. 10 of Table 1 was prepared in the following way:

Dye Coupling Component:

The compound of formula (IX),

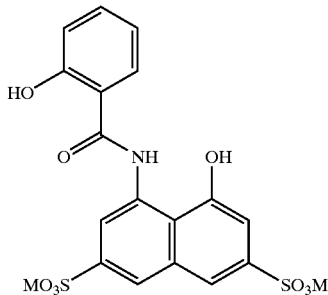

(IX)

wherein M represents Na, was prepared in the following way:

160.6 g (0.4 moles) of the monosodium salt of 4-amino-5-hydroxynaphthalene-2,7-disulfonic acid (Content 85%, available from MERCK Schuchardt, Darmstadt, Germany) were dissolved at a temperature of 50° C. in 320 ml of water by the addition of 80 ml of an aqueous solution of sodium hydroxide (30%). The mixture was stirred for 36 hours at a temperature of 75° C. after the addition of 21.2 g of sodium carbonate and 128.5 g (0.6 moles) of the sodium salt of phenylsalicylic acid (available from Acros Organics, Geel, Belgium). Afterwards 100 ml of water were added to the mixture, the value of pH of the reaction solution was adjusted to 7.0 by the addition of acetic acid and the resulting mixture was cooled down to room temperature. The precipitated product was collected by means of suction filtration and purified by washing with water. 103 g of the product of formula (IX) were obtained in this way.

The compound may also be prepared in the following way:

Solution of the Acid Chloride:

34.1 ml of thionyl chloride were added drop wise within 30 minutes to a solution of 70.3 g (0.39 moles) of acetylsalicylic acid (available from Acros Organics, Geel, Belgium), 200 ml of ethyl acetate and 10 ml of dimethylformamide at a temperature of 50° C. Afterwards the mixture was stirred for a further 2 hours at a temperature of 50° C. and the excess of thionyl chloride and part of ethyl acetate were distilled off.

Dye Coupling Component:

120.5 g (0.3 moles) of the monosodium salt of 4-amino-5-hydroxynaphthalene-2,7-disulfonic acid (85%) were dissolved at room temperature in 500 ml of water by the addition of sodium hydroxide (30%). The solution of the acid chloride was added within 1 hour under stirring to this solution while maintaining the value of pH at a value from 6.0 to 7.0 by simultaneous addition of an aqueous solution of sodium hydroxide (30%). Afterwards the reaction mixture was stirred for a further 2 hours at room temperature and the ethyl acetate was distilled off. The mixture was heated to a temperature of 70° C., the value of pH was increased to 11.5 by the addition of an aqueous solution of sodium hydroxide (30%) and stirring was continued for 1 hour under these conditions. Finally the value of pH was lowered to 7.0 at room temperature by the addition of acetic acid. 103 g of the compound of formula (IX) were obtained as a precipitate.

Suspension A:

30.3 g (0.1 moles) of 2-naphthylamine-1,5-disulfonic acid (available from Acros Organics, Geel, Belgium) were suspended in 400 ml of water and the value of pH was adjusted to 8.0 by the addition of an aqueous solution of sodium hydroxide (30%).

The resulting solution was cooled down to a temperature between 0° C. and 5° C. and 25 ml of an aqueous solution of sodium nitrite (4N) were added. 25 ml of an aqueous solution of hydrochloric acid (37%) were added within 10 minutes under stirring at a temperature of 0° C. to 10° C. Afterwards stirring was continued for 1 hour at this temperature. Finally the excess of nitrous acid was removed by reaction with sulfaminic acid.

Preparation of the Dye No. 10:

This cold suspension A was added within 30 minutes at an internal temperature of from 5° C. to 10° C. to 48.1 g of a suspension of the coupling component of formula (IX) while maintaining pH at a value from 6.0 to 8.0 by simultaneous addition of an aqueous solution of sodium hydroxide (20%). Stirring was continued for 2 hours at a temperature from 5° C. und 20° C. and for a further 18 hours at room temperature. The dye was salted out by addition of sodium chloride, the precipitate was filtered off and purified by double precipitation from water/ethanol. 55 g of dye No. 10 were obtained in this way.

Example 2

Compound No. 11 of Table 1 was prepared in the following way:

Dye Coupling Component:

The compound of formula (X),

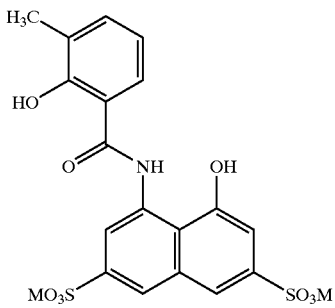

wherein M represents Na, was prepared in the following way:

Suspension of the Acid Chloride:

36.3 ml of thionyl chloride were added drop wise within 30 minutes to a solution of 38.4 g (0.25 moles) of 3-methylsalicylic acid (available from Acros Organics, Geel, Belgium), 170 ml of ethyl acetate and 5 ml of dimethylformamide at a temperature of 50° C. Afterwards the mixture was stirred for a further 2 hours at a temperature of 50° C. and the excess of thionyl chloride and part of ethyl acetate ere distilled off.

Dye Coupling Component:

60.2 g (0.15 moles) of the monosodium salt of 4-amino-5-hydroxynaphthalene-2,7-disulfonic acid (85%) were dissolved at room temperature in 500 ml of water by the addition of sodium hydroxide (30%). The suspension of the acid chloride was added within 1 hour under stirring to the solution at an internal temperature of from 5° C. to 10° C. while maintaining the value of pH at a value from 7.0 to 7.5 by simultaneous addition of an aqueous solution of sodium hydroxide (20%). After wards the reaction mixture was stirred for a further 2 hours at room temperature. Then the mixture was heated to a temperature of 60° C., the value of pH was adjusted to 11.5 by the addition of an aqueous solution of sodium hydroxide (30%) and stirring was continued for 1 hour under these conditions. Finally the value of pH was lowered to 7.0 at room temperature by the addition of acetic acid. 35 g of the compound of formula (X) were obtained as a precipitate.

Preparation of the Dye No. 11:

The suspension A of example 1 was added within 30 minutes at an internal temperature of from 5° C. to 10° C. to 48.1 g of a suspension of the coupling component of formula (X) in 300 ml of water while maintaining pH at a value from 6.0 to 8.0 by simultaneous addition of an aqueous solution of sodium hydroxide (20%). Stirring was continued for 2 hours at a temperature between 5° C. und 20° C. and for a further 18 hours at room temperature. The dye was salted out by addition of sodium chloride, the precipitate was filtered off and purified by double precipitation from water/ethanol. 52 g of dye No. 11 were obtained in this way.

The monoazo dyes No. 12 to 23 according to the invention may be prepared in a similar way by using appropriate starting materials.

Preparation of Ink Examples:

The present invention, as far as it relates to inks, is illustrated by the following examples using dyes according to the invention from Tables 1 and 2 and dyes representing the state of the art. 100 g of each ink were prepared by heating the necessary amount of dye (2–5 g), glycerol (5 g), ethylene glycol (5 g), Tergitol 15S-7 (available from Union Carbide Co., Houston, USA) (0.5 g) and a biocide solution (Mergal K 1 ON, available from Riedel-de-Haen, Seeize, Germany) (0.2 g) together with water at a temperature of 50° C. under stirring for about 1 hour. The resulting solution was cooled down to a temperature of 20° C., the value of pH was adjusted to 7.5 and the solution was passed through a Millipore® filter of 0.5 µm pore diameter. The dye quantity was adjusted in such a way that the optical density of the printed images was similar for all dyes.

Testing of Ink Examples:

The inks were then jetted onto the recording medium ILFORD Photo Paper DTPGP9 (available from ILFORD Imaging Switzerland GmbH, Fribourg, Switzerland) with a Canon BJC 8500 ink jet printer. Squares of 1 cm² containing a finely graded grid were printed, wherein the squares of this grid had a length of 8 pixels and the lines a width of 2 pixels. The printed samples were dried for 24 hours at a relative humidity of 59% of the air. Afterwards dye diffusion was determined in the printed samples.

Dye Diffusion:

The optical density of the dyed squares was measured using a densitometer Spectrolino™ available from Gretag Macbeth, Regensdorf, Switzerland. The printed samples were then stored for 7 days in a climatic test cabinet of Her äus at a temperature of 40° C. and relative humidity of 80%. After this storage period the samples were remeasured. The % density differences before and after storage are an indication of the amount of dye diffusion.

An example of increasing dye diffusion is given in FIG. 1.

Depending on the amount of dye diffusion the originally white grid gets more or less colored leading to an increase of the integral density of the test squares.

Results

The values of dye diffusion determined in this way are listed in Table 3.

TABLE 3

| Dye No. | Optical density before storage | Optical density after storage | % Density loss |
|---|---|---|---|
| 10 | 0.73 | 0.77 | 5.5 |
| 13 | 0.75 | 0.76 | 1.3 |
| II (US 5'254'160) | 0.73 | 0.83 | 13.7 |
| III (JP 03-203'970) | 0.71 | 0.92 | 29.6 |

A comparison of the measured density deviations of printed samples in Table 3, which are an indication of the amount of dye diffusion, clearly shows that the inks containing the monoazo dyes No. 10 and 13 according to the invention show considerably less dye diffusion than inks containing the known monoazo dyes (II) and (III). This means that the sharpness of ink jet printed images, containing the monoazo dyes according to the invention, deteriorates only very slightly even under adverse storage conditions.

Finally, variations from the examples given herein are possible in view of the above disclosure. Therefore, although the invention has been described with reference to certain preferred embodiments, it will be appreciated that other dyes may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. Monoazo dyes of general formulas (IV)

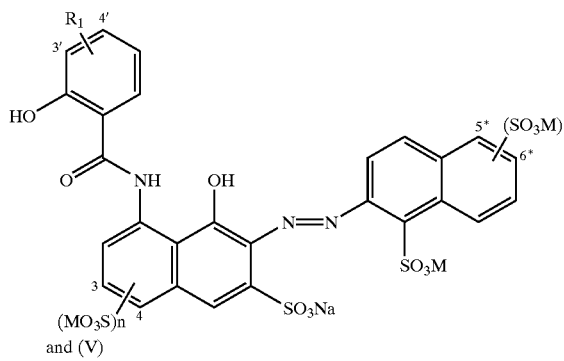

and (V)

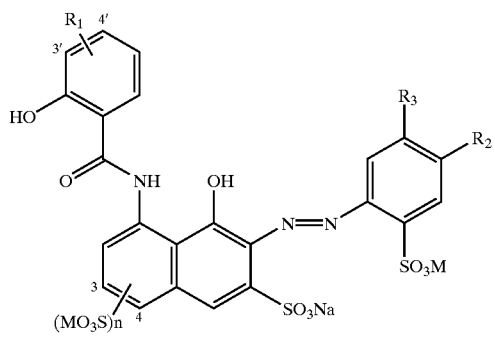

wherein
   $R_1$ represents hydrogen, alkyl having from 1 to 6 C atoms, nitro, fluoro, chloro or bromo;
   $R_2$, $R_3$ independently represent hydrogen, alkyl or alkoxy each having from 1 to 6 C atoms, substituted amide having up to 6 C atoms, where the substituents are selected from the group consisting of carboxy, hydroxy, carboxymethyl and carboxyethyl; fluoro, chloro or bromo;
   m is 0, 1 or 2;
   n is 0 or 1; and
   M represents hydrogen, a metal cation or an ammonium cation, which may be substituted by one or more alkyl or substituted alkyl groups each having from 1 to 18 C atoms.

2. Monoazo dyes according to claim 1, wherein
   $R_1$, $R_2$, $R_3$, m and n are as defined in claim 1 and
   M represents a cation of an alkali or an alkaline earth metal.

3. Monoazo dyes according to claim 1, wherein
   M and n are as defined in claim 1;
   $R_1$ represents hydrogen, alkyl having 1 or 2 C atoms, chloro or bromo;
   $R_2$, $R_3$ independently represent hydrogen, alkyl or alkoxy each having 1 or 2 C atoms, substituted amide having up to 6 C atoms, where the substituents are selected from the group consisting of carboxy, carboxymethyl and carboxyethyl; chloro or bromo; and
   m is 0 or 1.

4. Process for the preparation of monoazo dyes according to claim 1, wherein
   an amine of general formula (VI)

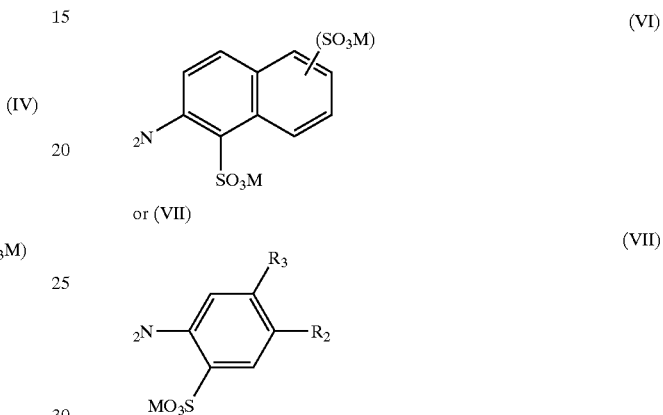

or (VII)

wherein $R_2$, $R_3$, m and M are as defined in claim 1, is diazotized and coupled afterwards with a compound of formula (VIII),

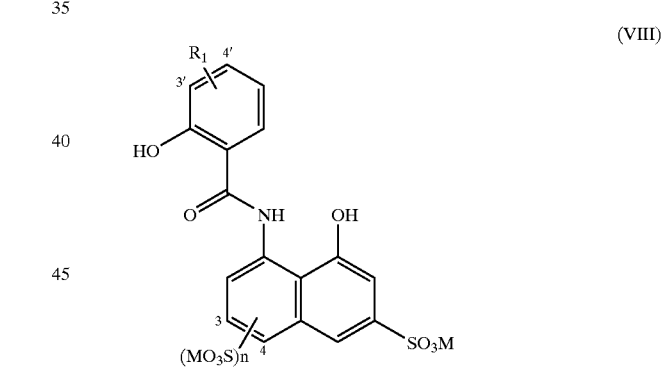

wherein M, $R_1$ and n are as defined in claim 1, under conditions that the dyes of general formulas (IV) and (V) are formed.

5. Process for dyeing cellulose containing materials, paper, cotton, viscose, leather and wool by applying thereto a monoazo dye according to claim 1.

6. Liquid dye preparations comprising at least one monoazo dye or a mixture of monoazo dyes according to claim 1.

7. Inks for ink jet printing, comprising at least one monoazo dye or a mixture of monoazo dyes according to claim 1.

8. Inks for ink jet printing, comprising in addition to at least one monoazo dye or a mixture of monoazo dyes according to claim 1 one or more other dyes.

* * * * *

UNITED STATES PATENT AND TRADEMARK OFFICE
CERTIFICATE OF CORRECTION

PATENT NO.    : 6,709,502 B2　　　　　　　　　　　　　　　　　　　　　　　Page 1 of 6
DATED         : September 29, 2004
INVENTOR(S)   : Steiger et al.

It is certified that error appears in the above-identified patent and that said Letters Patent is hereby corrected as shown below:

<u>Title page,</u>
Item [57], ABSTRACT,

Monoazo dye of formula (IV) delete

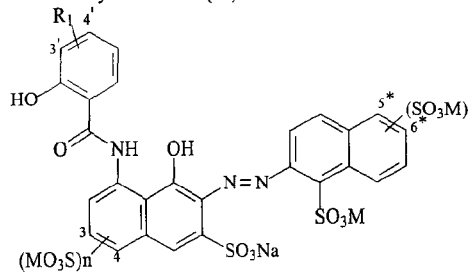

and insert

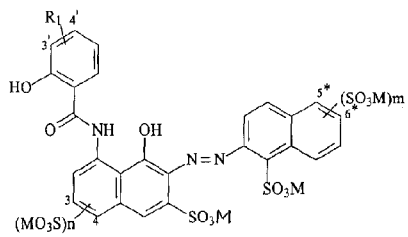

Monoazo dye of formula (V) delete

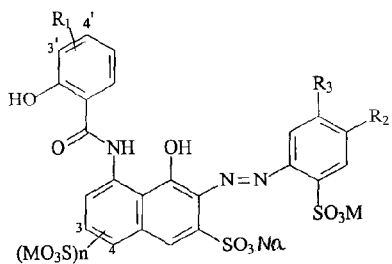

and insert

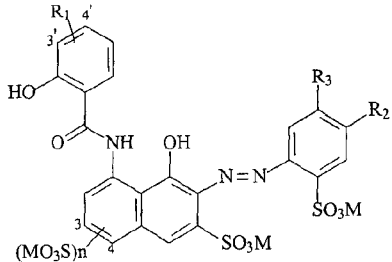

UNITED STATES PATENT AND TRADEMARK OFFICE
CERTIFICATE OF CORRECTION

PATENT NO. : 6,709,502 B2
DATED : September 29, 2004
INVENTOR(S) : Steiger et al.

It is certified that error appears in the above-identified patent and that said Letters Patent is hereby corrected as shown below:

Column 4,
Formula (IV) delete

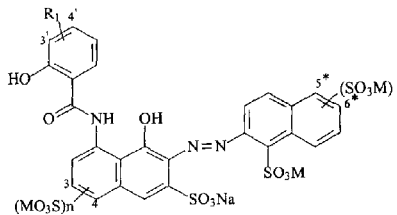

and insert

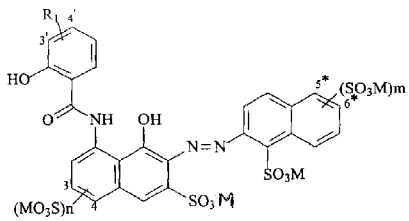

Formula (V) delete

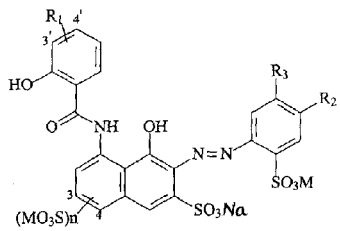

and insert

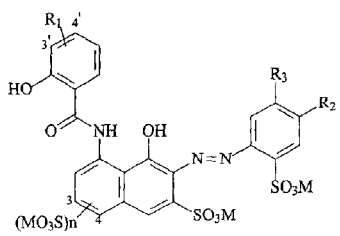

UNITED STATES PATENT AND TRADEMARK OFFICE
CERTIFICATE OF CORRECTION

PATENT NO. : 6,709,502 B2
DATED : September 29, 2004
INVENTOR(S) : Steiger et al.

It is certified that error appears in the above-identified patent and that said Letters Patent is hereby corrected as shown below:

Column 5,
Line 39, delete "2hydroxyethylammonium" and insert -- 2-hyroxyethylammonium --.
Formula (VI) delete

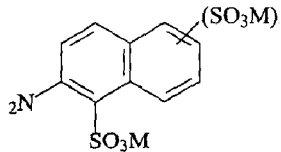

and insert

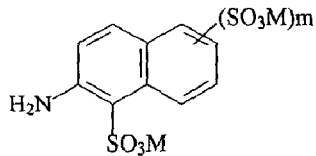

Column 6,
Formula (VII) delete

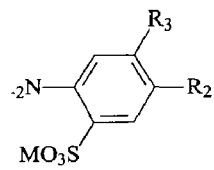

and insert

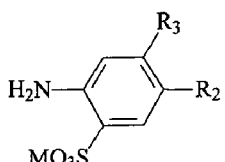

UNITED STATES PATENT AND TRADEMARK OFFICE
CERTIFICATE OF CORRECTION

PATENT NO.   : 6,709,502 B2
DATED        : September 29, 2004
INVENTOR(S)  : Steiger et al.

It is certified that error appears in the above-identified patent and that said Letters Patent is hereby corrected as shown below:

Column 7,
Line 14, delete "WO 96124,636" and insert -- WO 96/24,636 --.

Column 9,
Line 31, delete "ere" and insert -- were --.
Line 42, delete "After wards" and insert -- Afterwards --.

Column 10,
Line 9, delete "K 1 ON" and insert -- K 10N --.
Line 9, delete "Seeize" and insert -- Seelze --.
Lines 33 and 34, delete "Her äus" and insert -- Heräus --.

Column 11,
Claim 1, formula (IV) delete

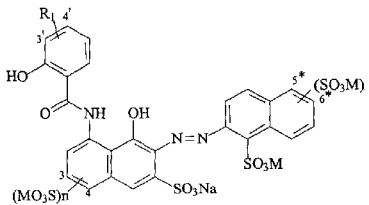

and insert

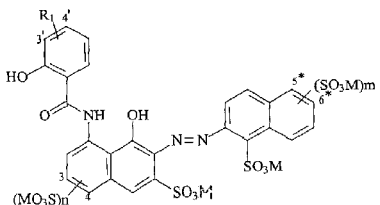

UNITED STATES PATENT AND TRADEMARK OFFICE
CERTIFICATE OF CORRECTION

PATENT NO.     : 6,709,502 B2
DATED          : September 29, 2004
INVENTOR(S)    : Steiger et al.

It is certified that error appears in the above-identified patent and that said Letters Patent is hereby corrected as shown below:

Column 11, cont'd.,
Formula (V) delete

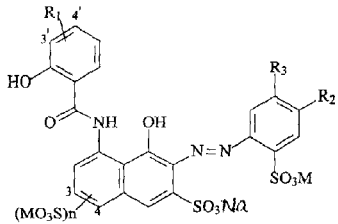

and insert

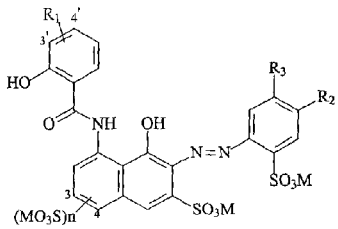

Column 12,
Claim 4, formula (VI) delete

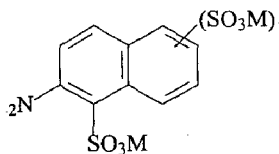

and insert

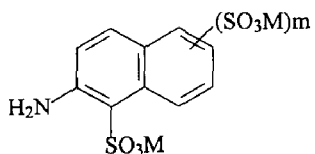

UNITED STATES PATENT AND TRADEMARK OFFICE
CERTIFICATE OF CORRECTION

PATENT NO.    : 6,709,502 B2
DATED         : September 29, 2004
INVENTOR(S)   : Steiger et al.

It is certified that error appears in the above-identified patent and that said Letters Patent is hereby corrected as shown below:

Column 12, cont'd.,
Claim 4, Formula (VII) delete

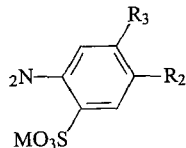

and insert

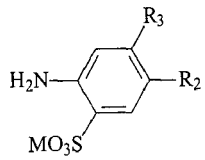

Signed and Sealed this

Twenty-first Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,709,502 B2
DATED : September 29, 2004
INVENTOR(S) : Steiger et al.

It is certified that error appears in the above-identified patent and that said Letters Patent is hereby corrected as shown below:

<u>Title page,</u>
Item [57], ABSTRACT,

Monoazo dye of formula (IV) delete

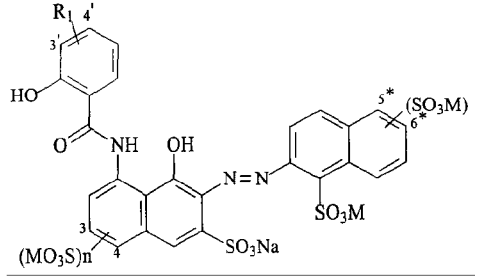

and insert

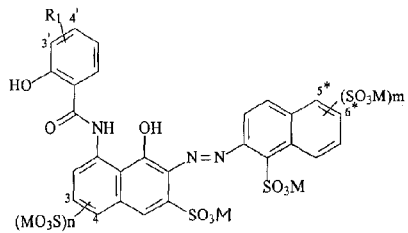

Monoazo dye of formula (V) delete

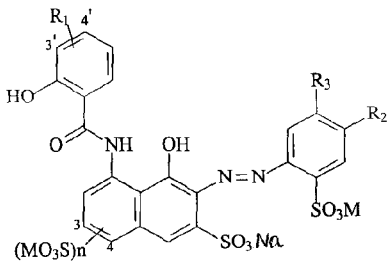

and insert

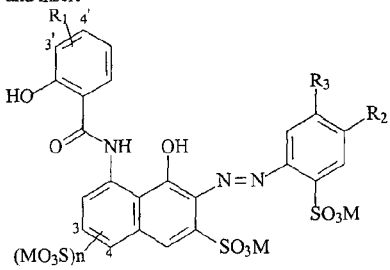

UNITED STATES PATENT AND TRADEMARK OFFICE
CERTIFICATE OF CORRECTION

PATENT NO.    : 6,709,502 B2  
DATED         : September 29, 2004  
INVENTOR(S)   : Steiger et al.

It is certified that error appears in the above-identified patent and that said Letters Patent is hereby corrected as shown below:

Column 4,  
Formula (IV) delete

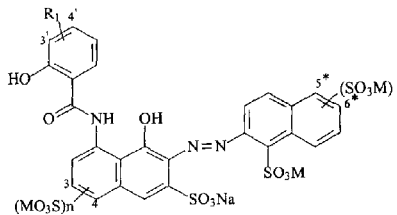

and insert

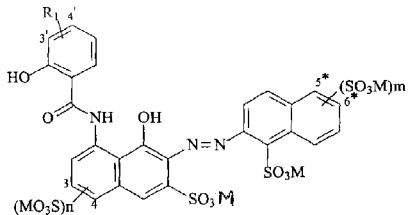

Formula (V) delete

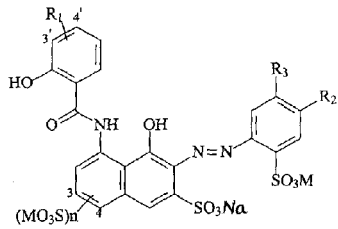

and insert

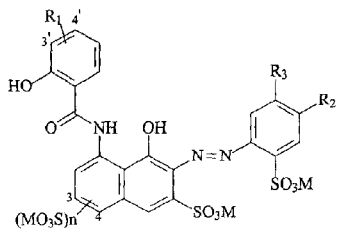

UNITED STATES PATENT AND TRADEMARK OFFICE
CERTIFICATE OF CORRECTION

PATENT NO. : 6,709,502 B2
DATED : September 29, 2004
INVENTOR(S) : Steiger et al.

It is certified that error appears in the above-identified patent and that said Letters Patent is hereby corrected as shown below:

Column 5,
Line 39, delete "2hydroxyethylammonium" and insert -- 2-hydroxyethylammonium --.
Formula (VI) delete

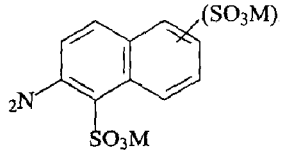

and insert

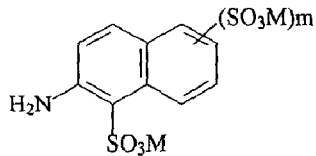

Column 6,
Formula (VII) delete

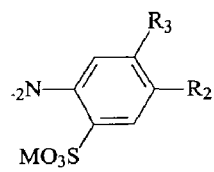

and insert

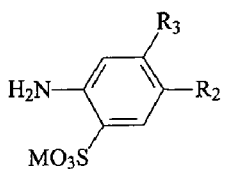

UNITED STATES PATENT AND TRADEMARK OFFICE
CERTIFICATE OF CORRECTION

PATENT NO. : 6,709,502 B2
DATED : September 29, 2004
INVENTOR(S) : Steiger et al.

It is certified that error appears in the above-identified patent and that said Letters Patent is hereby corrected as shown below:

Column 7,
Line 14, delete "WO 96124,636" and insert -- WO 96/24,636 --.

Column 9,
Line 31, delete "ere" and insert -- were --.
Line 42, delete "After wards" and insert -- Afterwards --.

Column 10,
Line 9, delete "K 1 ON" and insert -- K 10N --.
Line 9, delete "Seeize" and insert -- Seelze --.
Lines 33 and 34, delete "Her äus" and insert -- Heräus --.

Column 11,
Claim 1, formula (IV) delete

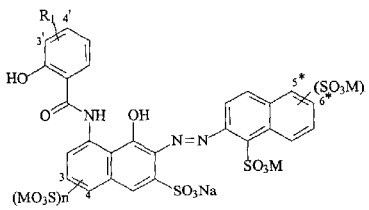

and insert

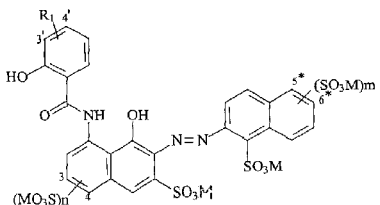

UNITED STATES PATENT AND TRADEMARK OFFICE
CERTIFICATE OF CORRECTION

PATENT NO. : 6,709,502 B2
DATED : September 29, 2004
INVENTOR(S) : Steiger et al.

It is certified that error appears in the above-identified patent and that said Letters Patent is hereby corrected as shown below:

Column 11, cont'd.,
Formula (V) delete

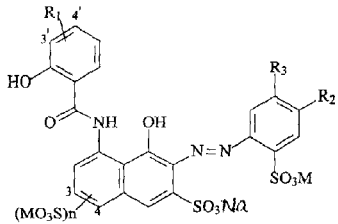

and insert

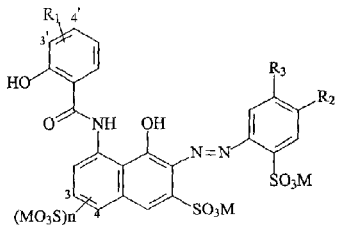

Column 12,
Claim 4, formula (VI) delete

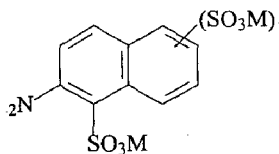

and insert

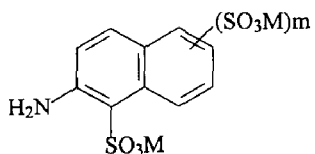

UNITED STATES PATENT AND TRADEMARK OFFICE
CERTIFICATE OF CORRECTION

PATENT NO.    : 6,709,502 B2
DATED         : September 29, 2004
INVENTOR(S)   : Steiger et al.

It is certified that error appears in the above-identified patent and that said Letters Patent is hereby corrected as shown below:

Column 12, cont'd.,
Claim 4, Formula (VII) delete

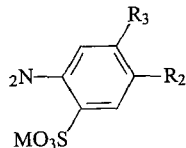

and insert

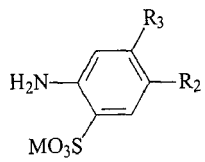

This certificate supersedes Certificate of Correction issued December 21, 2004.

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,709,502 B2
DATED : September 29, 2004
INVENTOR(S) : Baettig et al.

It is certified that error appears in the above-identified patent and that said Letters Patent is hereby corrected as shown below:

Title page,
Item [57], ABSTRACT, Monoazo dye of formula (IV), delete

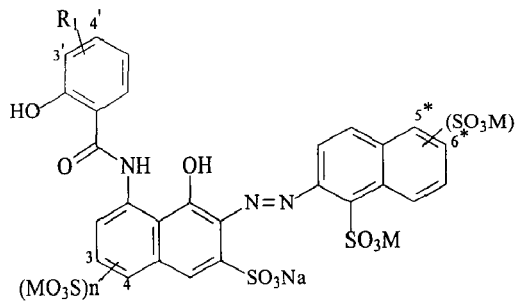  and insert  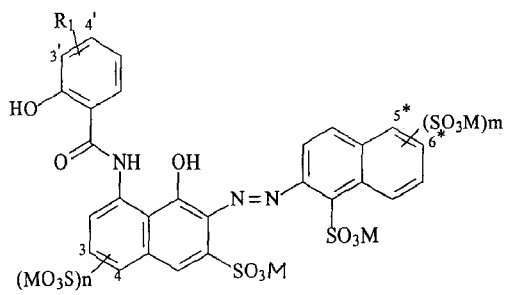

Monoazo dye of formula (V), delete

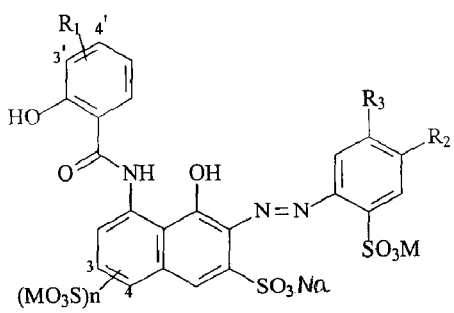  and insert  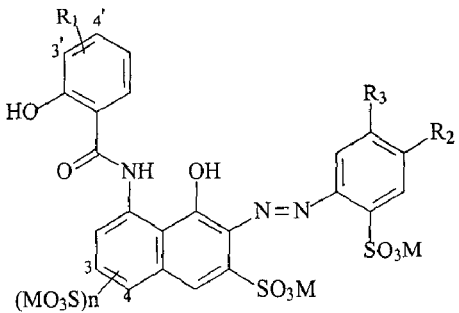

Column 4,
Formula (IV) delete

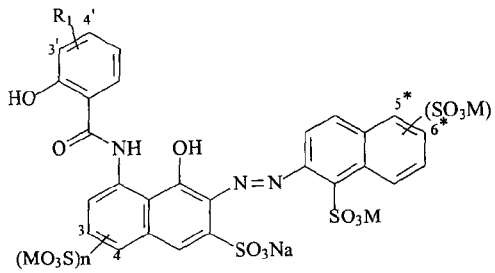  and insert  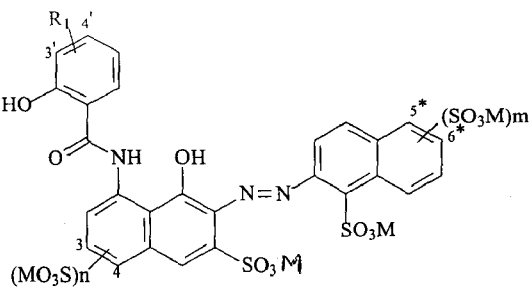

UNITED STATES PATENT AND TRADEMARK OFFICE
CERTIFICATE OF CORRECTION

PATENT NO. : 6,709,502 B2
DATED : September 29, 2004
INVENTOR(S) : Baettig et al.

It is certified that error appears in the above-identified patent and that said Letters Patent is hereby corrected as shown below:

Column 4 (cont'd),
Formula (V) delete

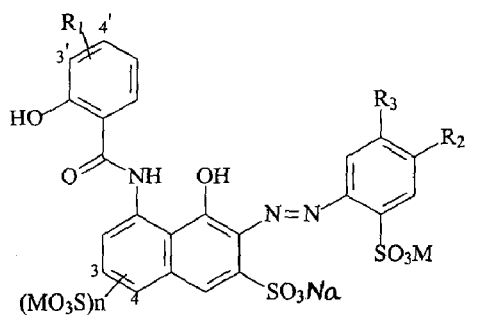 and insert 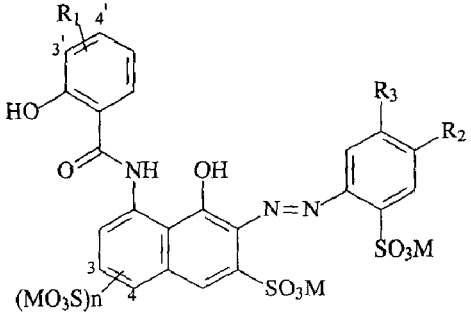

Column 5,
Line 39, delete "2hydroxyethylammonium" and insert -- 2-hydroxyethylammonium --.
Formula (VI) delete

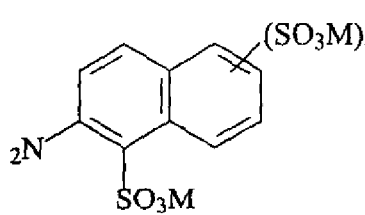 and insert 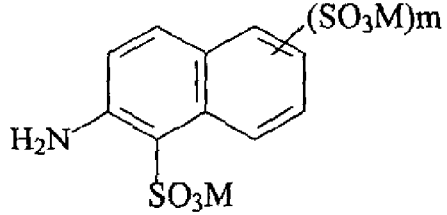

Column 6,
Formula (VII) delete

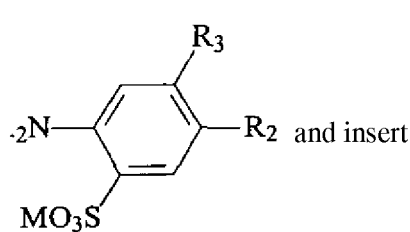 and insert 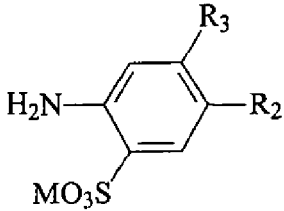

Column 7,
Line 14, delete "WO 96124,636" and insert -- WO 96/24,636 --.

UNITED STATES PATENT AND TRADEMARK OFFICE
CERTIFICATE OF CORRECTION

PATENT NO. : 6,709,502 B2  
DATED : September 29, 2004  
INVENTOR(S) : Baettig et al.

Page 3 of 4

It is certified that error appears in the above-identified patent and that said Letters Patent is hereby corrected as shown below:

Column 9,  
Line 31, delete "ere" and insert -- were --.  
Line 42, delete "After wards" and insert -- Afterwards --.

Column 10,  
Line 9, delete "K 1 ON" and insert -- K 10N --.  
Line 9, delete "Seeize" and insert -- Seelze --.  
Lines 33 and 34, delete "Her äus" and insert -- Heräus --.

Column 11,  
Claim 1, formula (IV) delete

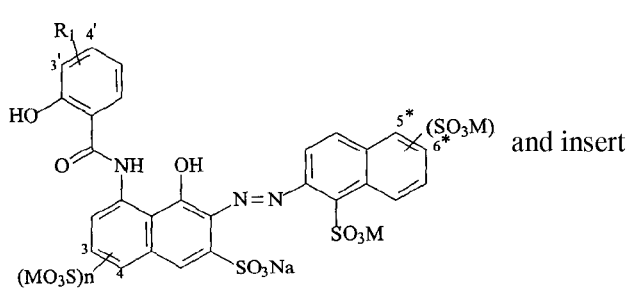 and insert 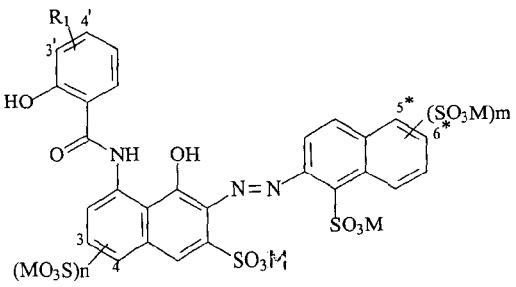

Formula (V) delete

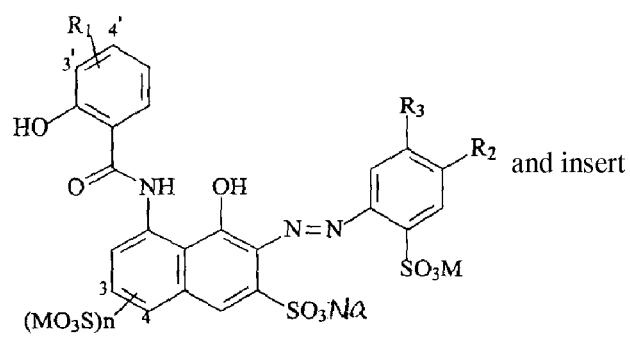 and insert 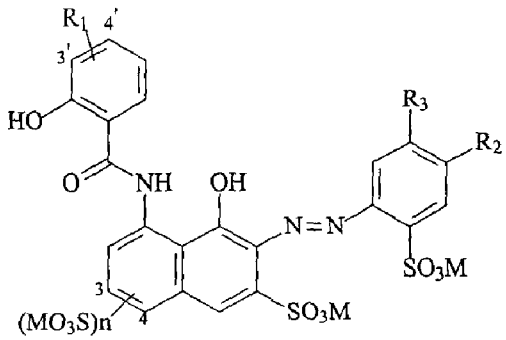

UNITED STATES PATENT AND TRADEMARK OFFICE
CERTIFICATE OF CORRECTION

PATENT NO. : 6,709,502 B2  
DATED : September 29, 2004  
INVENTOR(S) : Baettig et al.

It is certified that error appears in the above-identified patent and that said Letters Patent is hereby corrected as shown below:

Column 12,
Claim 4, formula (VI) delete

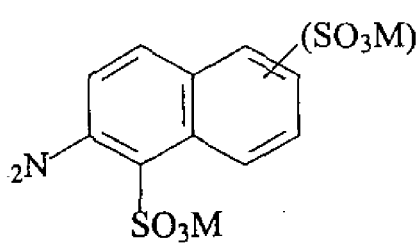 and insert 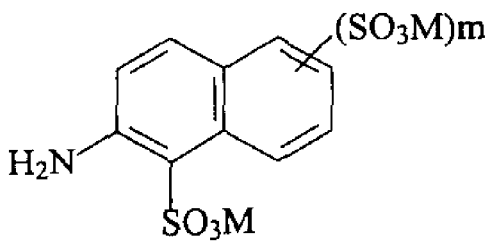

Claim 4, Formula (VII) delete

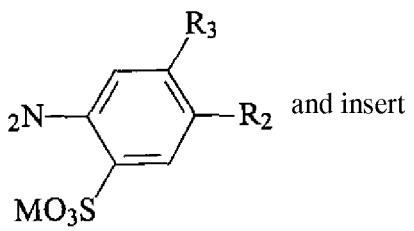 and insert 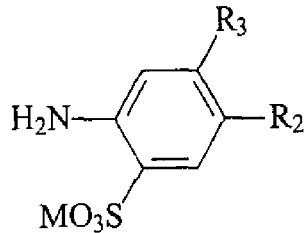

This certificate supersedes Certificate of Correction issued December 21, 2004 and June 28, 2005.

Signed and Sealed this

Eleventh Day of October, 2005

JON W. DUDAS  
*Director of the United States Patent and Trademark Office*